(12) United States Patent
Kitajima (10) Patent No.: US 10,440,339 B2
(45) Date of Patent: Oct. 8, 2019

(54) IMAGE PROCESSING APPARATUS, IMAGE PROCESSING METHOD, AND STORAGE MEDIUM FOR PERFORMING CORRECTION FOR A TARGET PIXEL HAVING HIGH LUMINANCE IN AN IMAGE

(71) Applicant: CANON KABUSHIKI KAISHA, Tokyo (JP)

(72) Inventor: Kotaro Kitajima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/693,069

(22) Filed: Aug. 31, 2017

(65) Prior Publication Data
US 2018/0077395 A1    Mar. 15, 2018

(30) Foreign Application Priority Data
Sep. 9, 2016  (JP) ................. 2016-176563

(51) Int. Cl.
| | |
|---|---|
| H04N 5/235 | (2006.01) |
| H04N 9/64 | (2006.01) |
| G06T 5/00 | (2006.01) |
| G06T 7/90 | (2017.01) |
| G06T 5/20 | (2006.01) |
| H04N 9/04 | (2006.01) |
| G06T 5/50 | (2006.01) |
| H04N 9/73 | (2006.01) |

(Continued)

(52) U.S. Cl.
CPC .............. H04N 9/646 (2013.01); G06K 9/00 (2013.01); G06K 9/00221 (2013.01); G06T 5/008 (2013.01); G06T 5/20 (2013.01); G06T 5/50 (2013.01); G06T 7/90 (2017.01); H04N 5/235 (2013.01); H04N 9/045 (2013.01); H04N 9/68 (2013.01); H04N 9/73 (2013.01); H04N 9/77 (2013.01); *G06T 2207/10024* (2013.01); *G06T 2207/20224* (2013.01); *G06T 2207/30201* (2013.01)

(58) Field of Classification Search
CPC .............................. H04N 5/235; H04N 5/2351
USPC ..................................... 348/223.1
See application file for complete search history.

(56) References Cited

U.S. PATENT DOCUMENTS

| | | | | |
|---|---|---|---|---|
| 5,638,136 A | * | 6/1997 | Kojima | H04N 5/2351 348/652 |
| 2003/0206245 A1 | * | 11/2003 | Lin | G06T 5/50 348/631 |

(Continued)

FOREIGN PATENT DOCUMENTS

JP         5867390 B2    2/2016

*Primary Examiner* — Anthony J Daniels
(74) *Attorney, Agent, or Firm* — Canon USA, Inc., IP Docketing (57) ABSTRACT

A reflection correction processing unit extracts at least color information from a peripheral area of a processing target pixel having a high luminance in an input image, and performs control, to the processing target pixel, to reduce the luminance of the processing target pixel and to bring a chrominance signal of the processing target pixel close to a predetermined chrominance signal ratio. In a case where a chrominance signal ratio based on the color information is close to the predetermined chrominance signal ratio, the reflection correction processing unit increases an intensity of the correction to the processing target pixel.

19 Claims, 9 Drawing Sheets

(51) Int. Cl.
*G06K 9/00* (2006.01)
*H04N 9/68* (2006.01)
*H04N 9/77* (2006.01)

(56) References Cited

U.S. PATENT DOCUMENTS

| | | | | |
|---|---|---|---|---|
| 2005/0030430 A1* | 2/2005 | Matsui | ................ | G09G 3/3611 348/673 |
| 2014/0086507 A1* | 3/2014 | Lin | ........................ | G06T 5/00 382/274 |
| 2014/0240533 A1* | 8/2014 | Hirooka | ................ | H04N 9/646 348/223.1 |

* cited by examiner

IMAGE PROCESSING APPARATUS, IMAGE PROCESSING METHOD, AND STORAGE MEDIUM FOR PERFORMING CORRECTION FOR A TARGET PIXEL HAVING HIGH LUMINANCE IN AN IMAGE

BACKGROUND OF THE INVENTION

Field of the Invention

The aspect of the embodiments relates to an image processing apparatus which performs correction, for a processing target pixel having a high luminance in an image, to reduce the luminance of the processing target pixel and to bring the processing target pixel close to a predetermined chrominance signal ratio, an image processing method, and a storage medium.

Description of the Related Art

When a captured image has a high-luminance saturation area in an object area, a technique for correcting the high-luminance saturation area has been conventionally performed. This technique enables a favorable image to be obtained by correcting the high-luminance saturation area, such as so-called shine, caused by environment light being reflected on the face of a person serving as an object. The high-luminance saturation area by the shine is hereinafter referred to as a shine area. Japanese Patent No. 5867390, for example, discusses a technique for detecting and correcting a reflection component, such as shine, by using a low frequency component of an input image. More specifically, the technique discussed in Japanese Patent No. 5867390 discusses detecting the low frequency component of the input image, calculating a reflection component on, for example, the face of an object from a difference between the input image and the low frequency component, and performing correction in such a manner that the area of the calculated reflection component comes close to a desired size. Accordingly, control to emphasize or reduce the reflection component, such as shine, occurring on the face can be performed. A texture of an image of the face is thus adjustable.

In the technique discussed in Japanese Patent No. 5867390, the reflection component is extracted based on only the difference between the input image and the low frequency component. However, in this case, even an area where brightness steeply changes, in particular the eye of the face (the white of the eye and an area peripheral thereto), is detected. This raises an issue that even an area not required to be corrected may be erroneously corrected.

SUMMARY OF THE INVENTION

According to an aspect of the embodiments, an image processing apparatus includes a detection unit configured to detect a specific object area from an image, a correction processing unit configured to perform correction, on a processing target pixel having a luminance higher than a predetermined value in the image, to reduce the luminance of the processing target pixel and to bring a chrominance signal ratio of the processing target pixel close to a predetermined chrominance signal ratio, wherein the predetermined chrominance signal ratio corresponds to a representative color of the specific object area, and an extraction unit configured to extract at least color information from a peripheral area of the processing target pixel in the image, wherein the correction processing unit compares a chrominance signal ratio based on the color information with the predetermined chrominance signal ratio and controls an intensity of the correction to the processing target pixel according to a comparison result.

Further features of the disclosure will become apparent from the following description of exemplary embodiments with reference to the attached drawings.

DESCRIPTION OF THE EMBODIMENTS

An exemplary embodiment of the disclosure will be described below with reference to the accompanying drawings. An image processing apparatus according to the present exemplary embodiment is applicable to a digital camera and a digital video camera, various types of portable terminals, such as a smartphone and a tablet terminal each having a camera function, an industrial camera, a vehicle camera, and a camera for medical use. In the present exemplary embodiment, a digital camera will be described as an applied example of the image processing apparatus. The digital camera according to the present exemplary embodiment has a function of correcting a high-luminance saturation area which has appeared white by light, such as environment light, being reflected on a surface of an object in a captured image. The present exemplary embodiment will be described using an example of correction processing (shine correction processing) which is performed for reducing a luminance of a high-luminance saturation area (shine area) in a specific object area, for example, the face of a person, while bringing the saturation area close to a chrominance signal ratio of a skin color of the face is performed.

<Schematic Configuration of Digital Camera and Schematic Flow of Processing Performed When Object is Captured>

Figure 1:
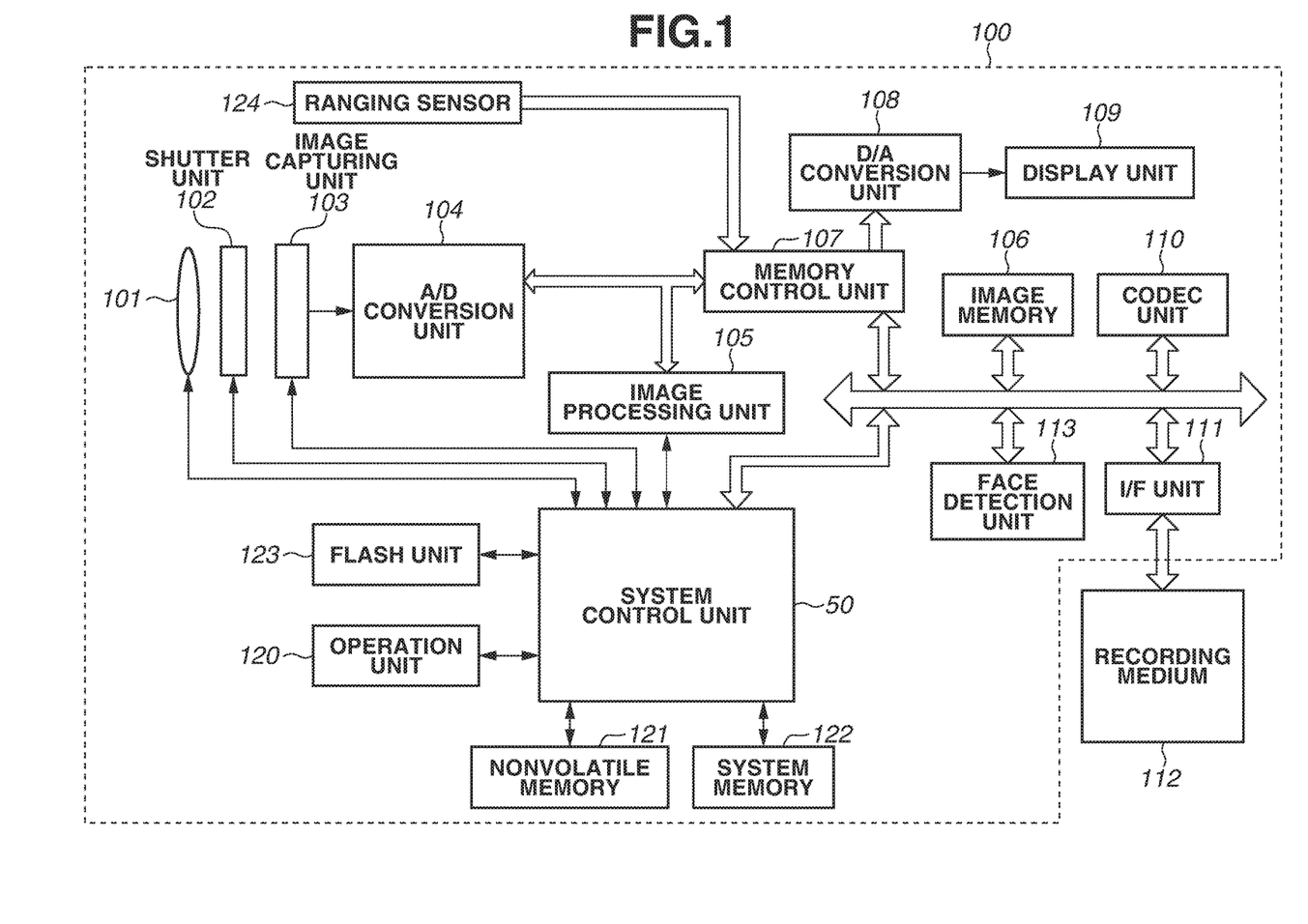
FIG. 1 illustrates an example of a schematic configuration of a digital camera according to the present exemplary embodiment.

FIG. 1 is a block diagram illustrating an example of a schematic configuration of a digital camera 100 according to the present exemplary embodiment.

In FIG. 1, a lens group 101 includes a zoom lens and a focus lens. A shutter unit 102 includes a diaphragm and a shutter. An image capturing unit 103 includes a charge-coupled device (CCD) element or a complementary metal oxide semiconductor (CMOS) element which converts an optical image formed on an imaging plane into an electrical signal (analog image signal) by the lens group 101. The image capturing unit 103 also includes color filters in red (R), green (G), and blue (B) corresponding to a so-called Bayer array. An analog-to-digital (A/D) conversion unit 104 converts an analog image signal output from the image capturing unit 103 into a digital image signal (image data). An image processing unit 105 performs various types of image processing, such as white balance processing, gamma (γ) processing, edge enhancement, and color correction processing, for the image data output from the A/D conversion unit 104. The memory control unit 107 controls writing and reading of the image data to and from the image memory 106. A digital-to-analog (D/A) conversion unit 108 converts input image data (a digital image signal) into an analog image signal. A display unit 109 includes a liquid crystal display (LCD), for example, and displays an image on a screen of the LCD. A codec unit 110 compresses and encodes the image data, and decompresses and decodes the compressed and encoded image data. An interface (I/F) unit 111 is an interface unit between a recording medium 112 and the other units. The recording medium 112 includes a memory card and a hard disk, and is detachably attached to the digital camera 100. A face detection unit 113 detects an image area (face area) on which a face is captured, for example, as a specific object area from within a captured image. A system control unit 50 controls an entire system of the digital camera 100. An operation unit 120 is a user interface unit for inputting various types of operation instructions from a user. A nonvolatile memory 121 includes an electrically erasable and programmable read only memory (EEPROM), and stores a program and parameters according to the present exemplary embodiment. A system memory 122 is a memory for loading a constant and a variable for operating the system control unit 50 and the program read out of the nonvolatile memory 121. A flash unit 123 is a light source device which emits flash light. A ranging sensor 124 is a sensor which detects an object distance from a camera to an object, and outputs object distance information in units of pixels as a two-dimensional object distance map image.

The basic processing procedure performed when the digital camera 100 captures an object according to the present exemplary embodiment illustrated in FIG. 1 will be described below.

The image capturing unit 103 photoelectrically converts light incident on the imaging plane via the lens group 101 and the shutter unit 102, and outputs the photoelectrically converted light as an analog image signal to the A/D conversion unit 104. The A/D conversion unit 104 converts the analog image signal fed from the image capturing unit 103 into a digital image signal (image data), and outputs the image data to the image processing unit 105 and the memory control unit 107.

The image data fed from the A/D conversion unit 104 or the image data fed from the memory control unit 107 are fed as input image data into the image processing unit 105. The image processing unit 105 performs various types of image processing to the input image data. Examples of the image processing include color conversion processing, such as white balance adjustment, gamma processing, and edge enhancement processing. In the present exemplary embodiment, the image processing unit 105 also performs correction processing (shine correction processing) to a high-luminance saturation area (shine area), described below. Detailed description of the image processing unit 105 will be described below.

The image processing unit 105 performs predetermined evaluation value calculation processing using information about a face detection result by the face detection unit 113 (information representing a face area in an input image), input image data obtained by image capturing, and an object distance map generated in the ranging sensor 124. Information about an evaluation value calculation result is fed into the system control unit 50. The system control unit 50 performs exposure control to adjust exposure to the face of the object and ranging control to bring the face into focus, for example, based on the information about the evaluation value calculation result. More specifically, the system control unit 50 performs automatic focus (AF) processing, automatic exposure (AE) processing, and automatic white balance (AWB) processing by a so-called through-the-lens (TTL) system. Various known techniques can be used for an evaluation value to be used when exposure control or ranging control is performed and processing for calculating the evaluation value, and description and illustration thereof are omitted.

The image data subjected to the image processing by the image processing unit 105 is written into the image memory 106 via the memory control unit 107. The image memory 106 temporarily stores the image data which is captured by the image capturing unit 103 and output from the A/D conversion unit 104, the image data subjected to the image processing by the image processing unit 105, and image data for displaying an image on the display unit 109.

The D/A conversion unit 108 converts the data for image display stored in the image memory 106 into an analog signal, and feeds the analog signal into the display unit 109. The display unit 109 displays an image corresponding to the analog signal from the D/A conversion unit 108 on a display device, such as a liquid crystal display (LCD).

The codec unit 110 compresses and encodes the image data temporarily stored in the image memory 106 based on standards such as so-called Joint Photographic Experts Group (JPEG) and Moving Picture Experts Group (MPEG). The system control unit 50 records the image data, which has been compressed and encoded by the codec unit 110, on the recording medium 112 via the I/F unit 111.

The foregoing is a basic operation of when the object is captured in the digital camera 100 according to the present exemplary embodiment. In addition to the basic operation, the system control unit 50 performs control to implement various types of processing including processing for detecting a high-luminance saturation area and shine correction processing in the present exemplary embodiment, described below, by executing the above-described program stored in the nonvolatile memory 121. The program means a program for performing processing in each of flowcharts, described below, in the digital camera 100 according to the present exemplary embodiment. In this case, the constant and the variable for operating the system control unit 50 and the program read out of the nonvolatile memory 121 are loaded into the system memory 122.

<Schematic Configuration of Image Processing Unit>

Figure 2:
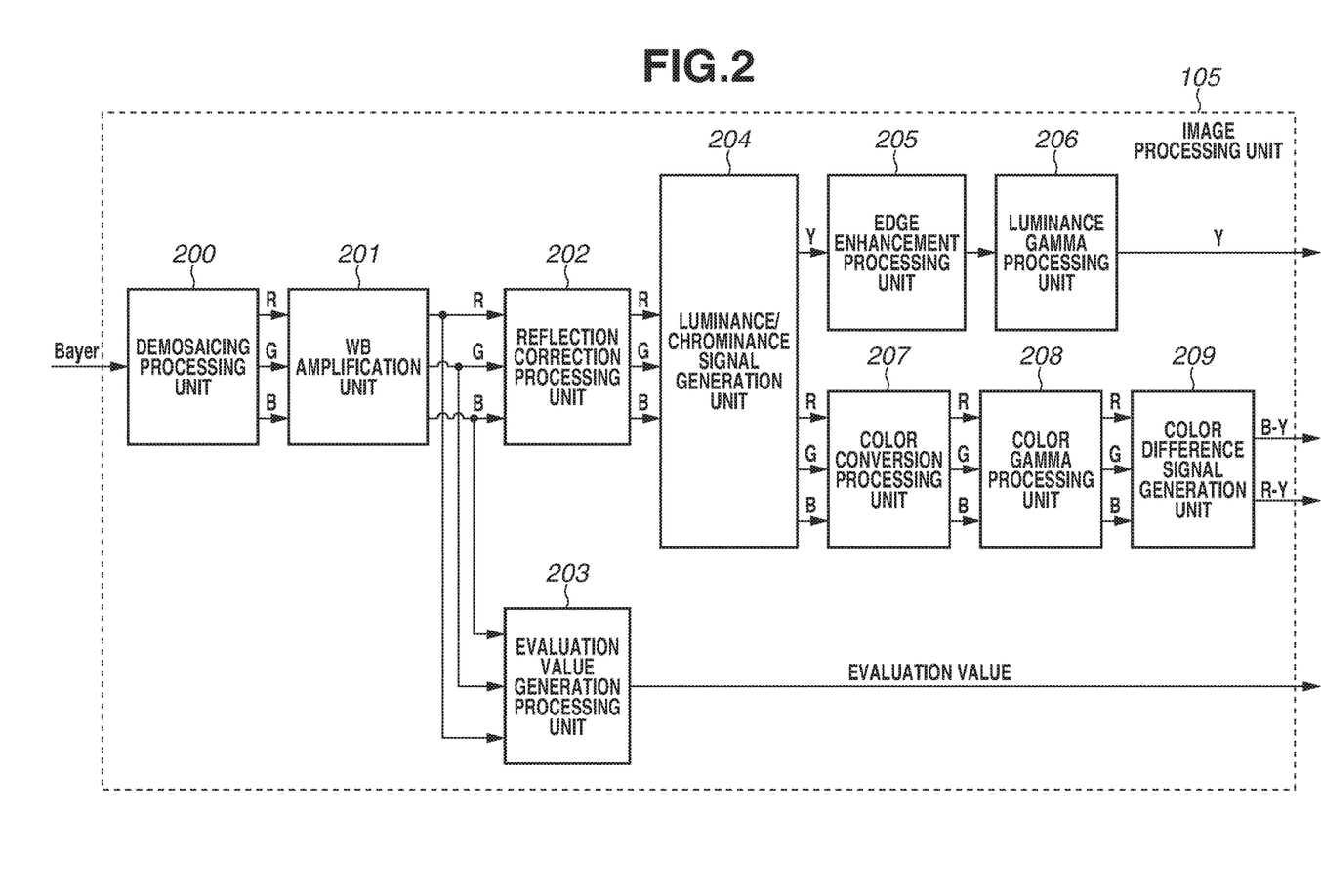
FIG. 2 illustrates an example of a schematic configuration of an image processing unit.

Details of the image processing unit 105 will be described below with reference to FIG. 2. FIG. 2 is a block diagram illustrating a schematic configuration of the image processing unit 105. While FIG. 2 illustrates an example in which the image processing by the image processing unit 105 is implemented by a hardware configuration, the processing in each of the units illustrated in FIG. 2 may be implemented by a central processing unit (CPU) executing the program.

In FIG. 2, the image processing unit 105 includes a demosaicing processing unit 200, a wideband (WB) amplification unit 201, a reflection correction processing unit 202, an evaluation value generation processing unit 203, and a luminance/chrominance signal generation unit 204. The image processing unit 105 further includes an edge enhancement processing unit 205, a luminance gamma processing unit 206, a color conversion processing unit 207, a color gamma processing unit 208, and a color difference signal generation unit 209.

In the image processing unit 105, the image data fed from the A/D conversion unit 104 illustrated in FIG. 1 is input to the demosaicing processing unit 200. The image data input to the demosaicing processing unit 200 is R, G, and B data corresponding to a so-called Bayer array. The demosaicing processing unit 200 performs demosaicing processing to the input image data corresponding to the Bayer array, to generate R, G, and B chrominance signals (hereinafter referred to as R, G, and B signals). The R, G, and B signals generated in the demosaicing processing unit 200 are fed into the WB amplification unit 201.

The WB amplification unit 201 multiplies the R, G, and B signals by a gain to perform white balance adjustment processing, based on a white balance gain value calculated by the system control unit 50. The R, G, and B signals respective white balances of which have been adjusted by the WB amplification unit 201 are fed to each of the reflection correction processing unit 202 and the evaluation value generation processing unit 203.

The reflection correction processing unit 202 performs shine correction processing, described below, to an input image including the R, G, and B signals corresponding to each pixel subjected to the white balance adjustment, and then outputs the corrected R, G, and B signals to the luminance/chrominance signal generation unit 204. The luminance/chrominance signal generation unit 204 generates a luminance signal Y from the R, G, and B signals corresponding to each pixel, and outputs the generated luminance signal Y to the edge enhancement processing unit 205 and outputs the R, G, and B signals to the color conversion processing unit 207.

The edge enhancement processing unit 205 performs edge enhancement processing to an image including the luminance signal Y corresponding to each pixel fed from the luminance/chrominance signal generation unit 204, and outputs the luminance signal Y subjected to the edge enhancement processing to the luminance gamma processing unit 206. The luminance gamma processing unit 206 performs gamma correction to the luminance signal Y fed from the edge enhancement processing unit 205. The luminance signal Y subjected to the gamma correction is fed into the image memory 106, and is temporarily stored therein.

The color conversion processing unit 207 performs a matrix operation to the R, G, and B signals fed from the luminance/chrominance signal generation unit 204, to generate the R, G, and B signals in a desired color balance, and outputs the generated R, G, and B signals to the color gamma processing unit 208. The color gamma processing unit 208 performs color gamma correction to the R, G, and B signals fed from the color conversion processing unit 207, and outputs the processed R, G, and B signals to the color difference signal generation unit 209. The color difference signal generation unit 209 generates color difference signals R-Y and B-Y from the R, G, and B signals corresponding to each pixel, which have been subjected to the color gamma correction by the color gamma processing unit 208. The color difference signals R-Y and B-Y corresponding to each pixel are fed into the image memory 106, and are temporarily stored therein.

Image data including the image signal Y and the color difference signals R-Y and B-Y temporarily stored in the image memory 106 is fed into the codec unit 110 illustrated in FIG. 1 under the control of the system control unit 50. The codec unit 110 compresses and encodes the image data based on predetermined standards such as JPEG and MPEG. The image data, which has been compressed and encoded by the codec unit 110, is recorded in the recording medium 112 via the I/F unit 111 under the control of the system control unit 50.

Figure 3A:
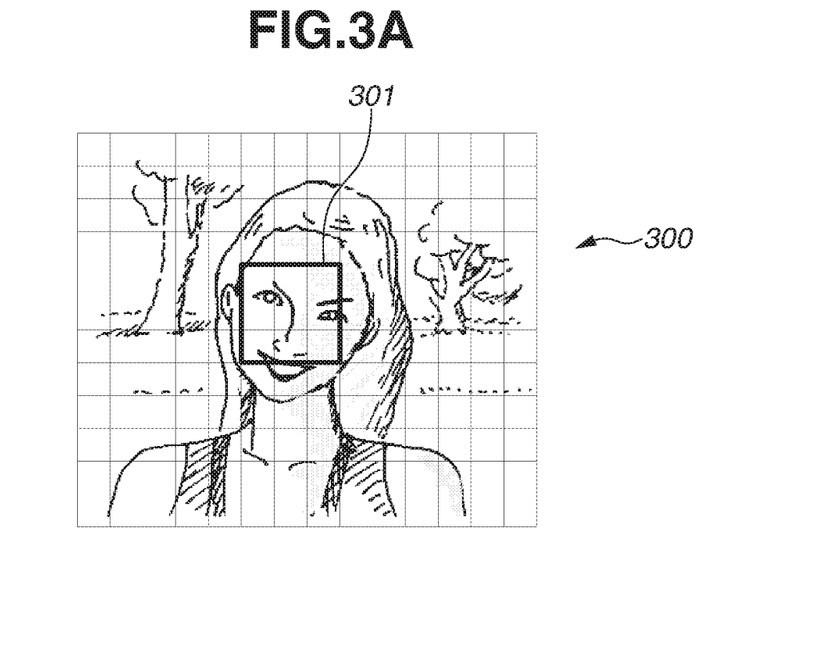
FIGS. 3A and 3B each illustrate an example of division of an input image into blocks.
Figure 3B:
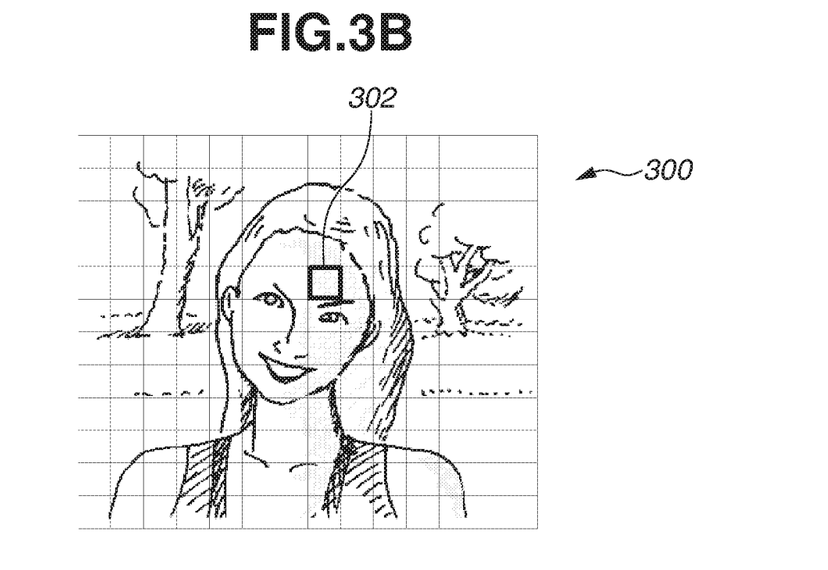

The evaluation value generation processing unit 203 divides the input image including the R, G, and B signals corresponding to each pixel fed from the WB amplification unit 201 into a plurality of blocks, and for each of the blocks, obtains average values (R, G, and B average values) from the R, G, and B signals corresponding to each pixel. The R, G, and B average values for each of the blocks are fed as an evaluation value into the system control unit 50. In the present exemplary embodiment, the evaluation value for each of the blocks generated by the evaluation value generation processing unit 203 is used not only when the above-described exposure control is performed but also when parameters to be used in the shine correction processing, described below, are determined. FIGS. 3A and 3B are diagrams each illustrating an example of a case where an input image 300 is divided into a plurality of block areas. In each of the examples illustrated in FIGS. 3A and 3B, grids represent the respective block areas. An evaluation value in each of the block areas illustrated in FIGS. 3A and 3B is also used to determine parameters for the face detection processing in the face detection unit 113 and the shine correction processing in the reflection correction processing unit 202.

<Detailed Configuration of and Details of Processing by Reflection Correction Processing>

Figure 4:
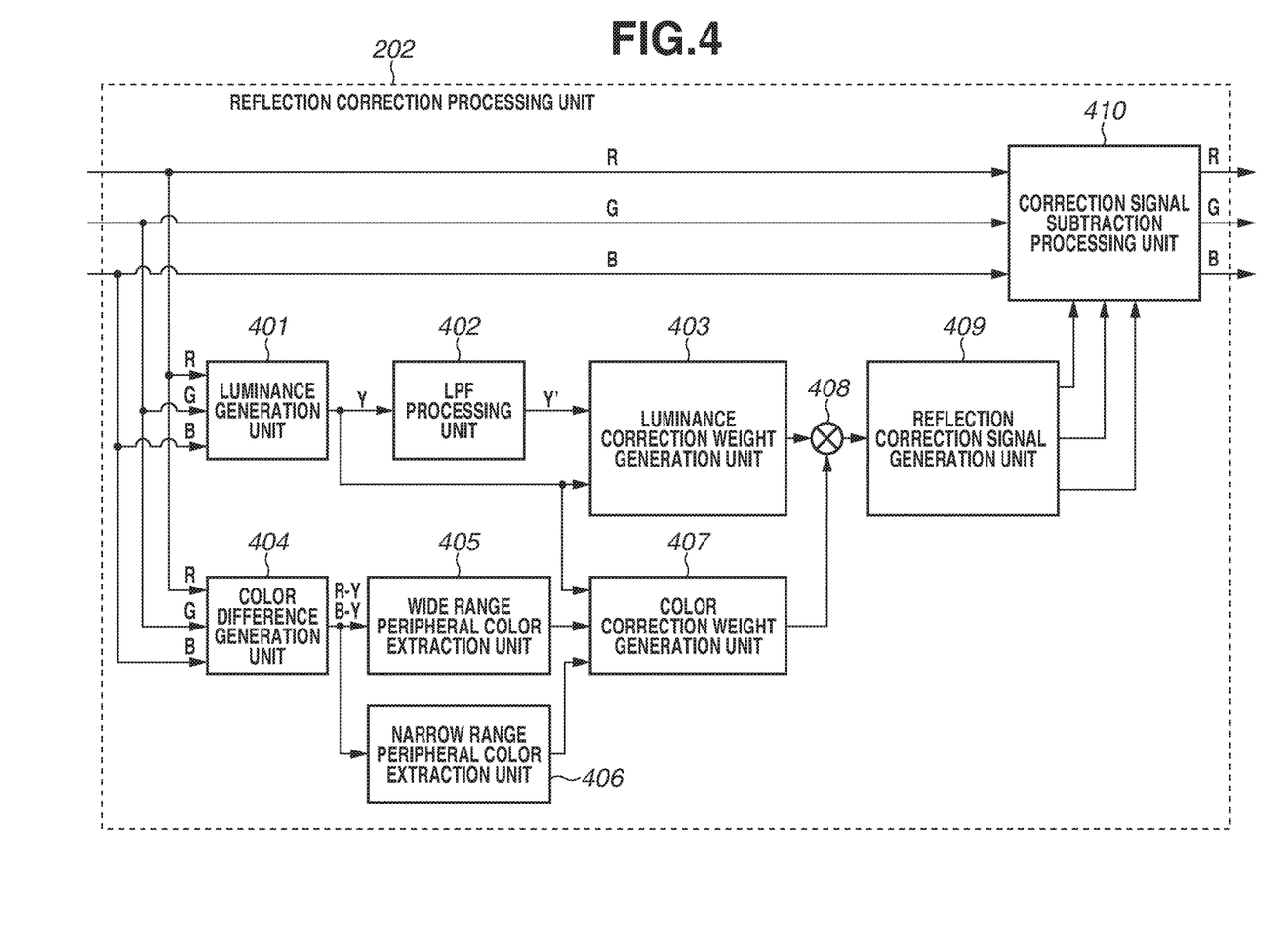
FIG. 4 illustrates an example of a schematic configuration of a reflection correction processing unit.

FIG. 4 illustrates an example of a detailed configuration example of the reflection correction processing unit 202. A configuration and an operation of the reflection correction processing unit 202 will be described below with reference to FIG. 4.

The reflection correction processing unit 202 includes a luminance generation unit 401, a low-pass filter (LPF) processing unit 402, a luminance correction weight generation unit 403, a color difference generation unit 404, a wide range peripheral color extraction unit 405, a narrow range peripheral color extraction unit 406, and a color correction weight generation unit 407. In addition, the reflection correction processing unit 202 includes a multiplication unit 408, a reflection correction signal generation unit 409, and a correction signal subtraction processing unit 410.

Figure 5A:
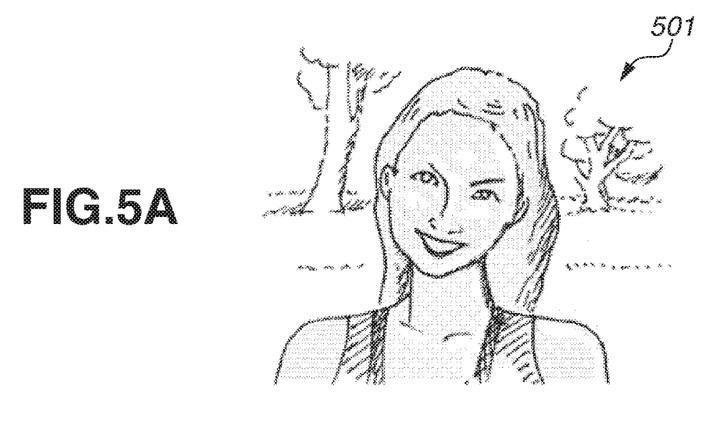
FIGS. 5A, 5B, and 5C are diagrams each used for describing a luminance of an input image and a luminance correction weight.
Figure 5B:
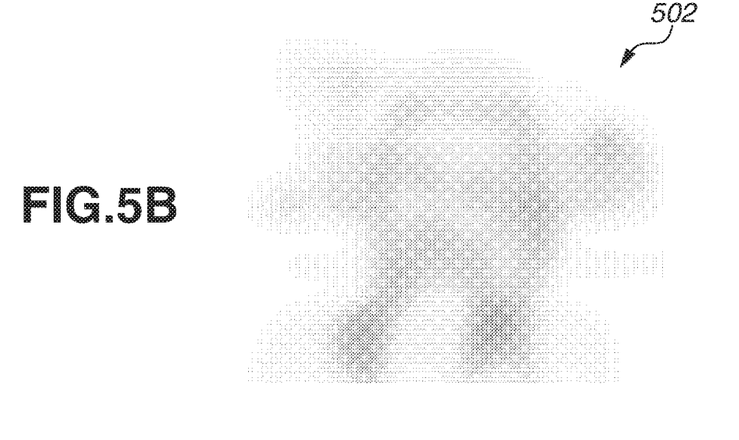

The luminance generation unit 401 generates a luminance signal Y from the R, G, and B signals corresponding to each pixel, white balance of which have been adjusted by the WB amplification unit 201 illustrated in FIG. 2, and outputs the luminance signal Y to the LPF processing unit 402 and the luminance correction weight generation unit 403. The LPF processing unit 402 performs LPF processing to the input luminance signal Y, and outputs a luminance signal Y' subjected to the LPF processing to the luminance correction weight generation unit 403. FIG. 5A illustrates an example of an input image 501 including the luminance signal Y generated by the luminance generation unit 401. FIG. 5B illustrates an example of an image 502 including the luminance signal Y' obtained after the LPF processing by the LPF processing unit 402 for the input image 501 including the luminance signal Y illustrated in FIG. 5A.

The luminance correction weight generation unit 403 subtracts the luminance signal Y' obtained after the LPF processing from the luminance signal Y, to calculate a luminance correction weight Yw for each pixel. More specifically, the luminance correction weight generation unit 403 calculates the luminance correction weight Yw by the following equation (1):

$$Yw = Y - Y' \quad (1).$$

Figure 5C:
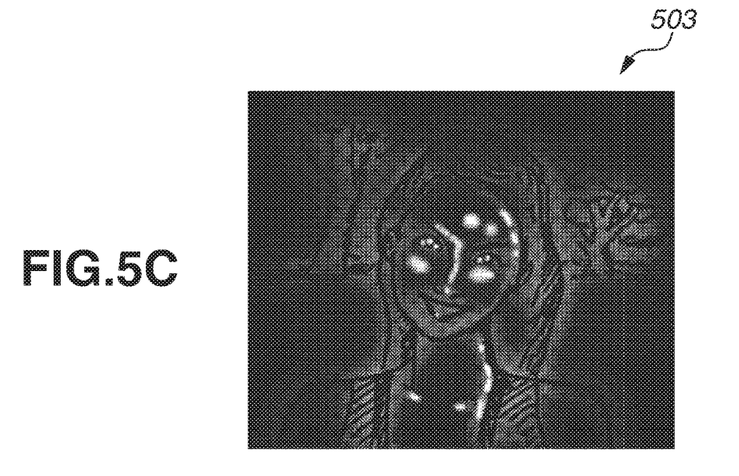

The luminance correction weight Yw is more than "0" (Yw>0), and is normalized at an upper limit value of the luminance signal Y. FIG. 5C illustrates an example of an image 503 represented by a signal corresponding to the luminance correction weight Yw generated by the luminance correction weight generation unit 403 in the examples of the input image 501 including the luminance signal Y illustrated in FIG. 5A and the image 502 including the luminance signal Y' illustrated in FIG. 5B.

The color difference generation unit 404 generates color difference signals R-Y and B-Y from the R, G, and B signals corresponding to each pixel subjected to the white balance adjustment by the WB amplification unit 201 illustrated in FIG. 2, and outputs the color difference signals R-Y and B-Y to each of the wide range peripheral color extraction unit 405 and the narrow range peripheral color extraction unit 406.

Figure 6A:
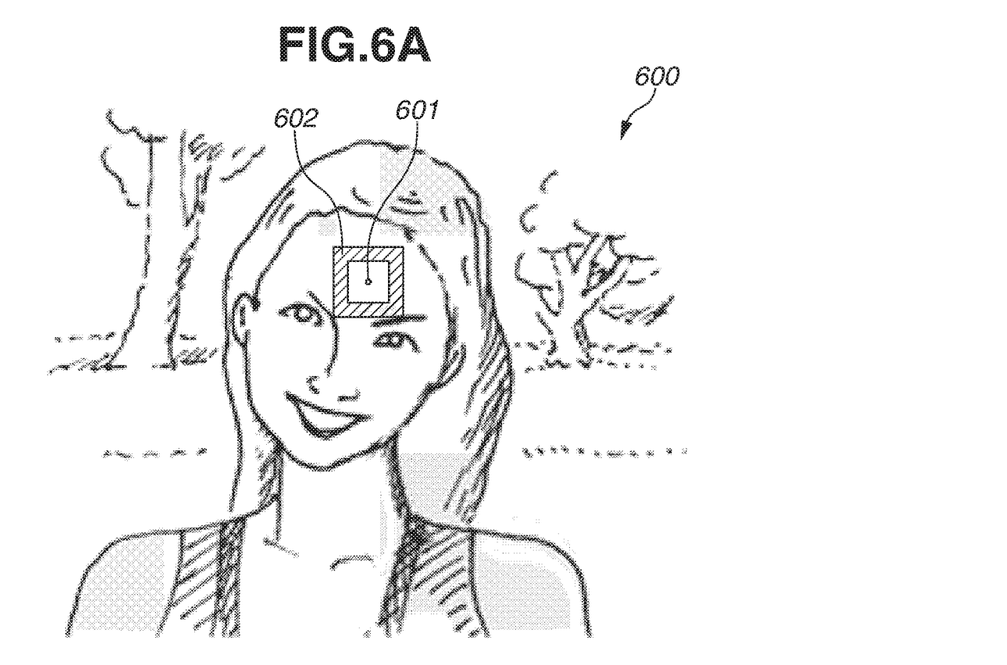
FIGS. 6A and 6B each illustrate an example of extraction of a peripheral area.

The wide range peripheral color extraction unit 405 calculates average values of the color difference signals corresponding to each pixel included in an area covering a wide range peripheral to a focused pixel to be processed in the present exemplary embodiment. In the present exemplary embodiment, if the focused pixel is the pixel having a higher luminance than those of the pixels in its vicinity, the focused pixel is set as a processing target pixel to be subjected to shine correction processing. The wide range peripheral to the processing target pixel (focused pixel) means a range relative to a narrow area range in the narrow range peripheral color extraction unit 406, described below. In the present exemplary embodiment, the area covering the wide range is hereinafter referred to as a wide range peripheral area. FIG. 6A illustrates an example of an input image 600, and a processing target pixel 601 and a wide range peripheral area 602 in the input image 600. In the example illustrated in FIG. 6A, the wide range peripheral area 602 is set as an area covering a wide range centered around the processing target pixel 601 and indicated by diagonal lines at some distance away from the processing target pixel 601. In the example illustrated in FIG. 6A, the size and the shape of the wide range peripheral area 602 are a previously determined fixed size and shape. The wide range peripheral color extraction unit 405 calculates average values R-Yw and B-Yw of the color difference signals R-Y and B-Y corresponding to each pixel included in the wide range peripheral area 602. In the present exemplary embodiment, the wide range peripheral color extraction unit 405 does not use the pixel having a luminance lower than a predetermined luminance among the pixels within the wide range peripheral area 602, to calculate the average values. Thus, the average values R-Yw and B-Yw calculated by the wide range peripheral color extraction unit 405 are sent to the color correction weight generation unit 407.

Figure 6B:
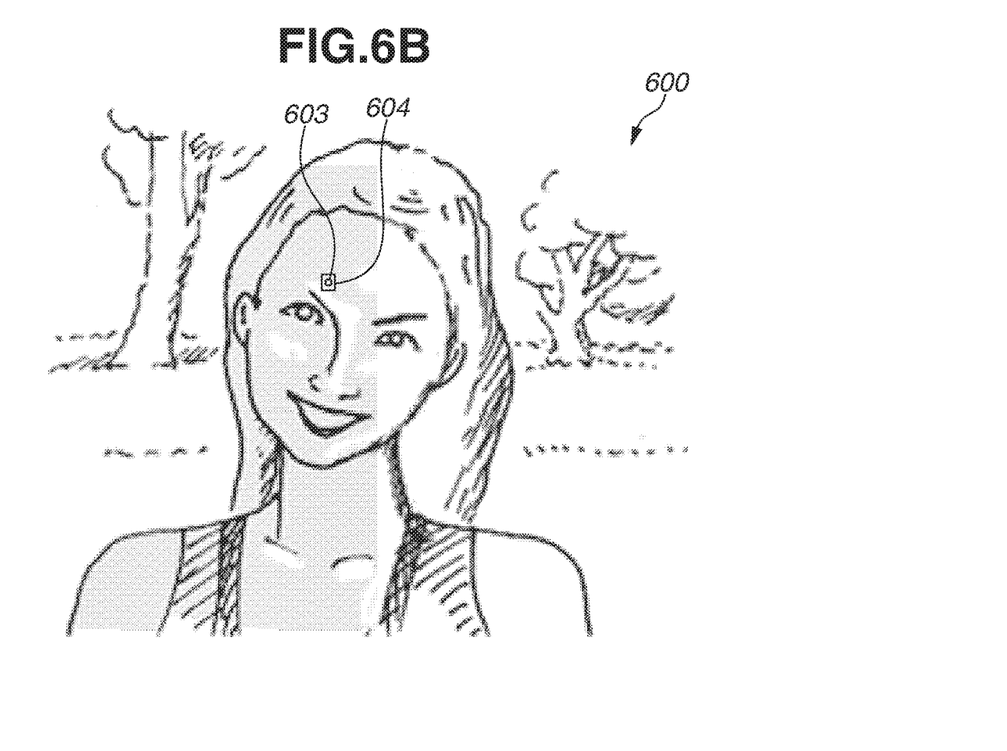

On the other hand, the narrow range peripheral color extraction unit 406 calculates average values of the color difference signals corresponding to each pixel included in an area covering a narrow range peripheral to the processing target pixel. In this case, similar to the above-described case, if the focused pixel is the pixel having a higher luminance than those of the pixels in its vicinity, the focused pixel is set as a processing target pixel to be subjected to shine correction processing. The narrow range peripheral to the processing target pixel means a range relative to a wide range peripheral area in the wide range peripheral color extraction unit 405. In the present exemplary embodiment, the area covering the narrow range is hereinafter referred to as a narrow range peripheral area. FIG. 6B illustrates an example of an input image 600, and a processing target pixel 603 and a narrow range peripheral area 604 in the input image 600. In the example illustrated in FIG. 6B, the narrow range peripheral area 604 is set as an area covering a narrow range centered around the processing target pixel 603 and indicated by a square. In the example illustrated in FIG. 6B, the size and the shape of the narrow range peripheral area 604 are a previously determined fixed size and shape. The narrow range peripheral color extraction unit 406 calculates average values R-Yn and B-Yn of the color difference signals R-Y and B-Y corresponding to each pixel included in the narrow range peripheral area 604. Also in this case, the narrow range peripheral color extraction unit 406 does not use the pixel having a luminance lower than a predetermined luminance among the pixels within the narrow range peripheral area 604, to calculate the average values. Thus, the average values R-Yn and B-Yn of the color difference signals calculated by the narrow range peripheral color extraction unit 406 are sent to the color correction weight generation unit 407.

The color correction weight generation unit 407 calculates a color correction weight Cw representing color likeness, specifically skin color likeness with a predetermined chrominance signal ratio from the average values R-Yw and B-Yw of the color difference signals R-Y and B-Y in the wide range peripheral area 602 and the average values R-Yn and B-Yn of the color difference signals R-Y and B-Y in the narrow range peripheral area 604, described above. When the wide range peripheral area 602 and the narrow range peripheral area 604 are described without being distinguished, they are collectively merely referred to as "peripheral area".

Figure 7A:
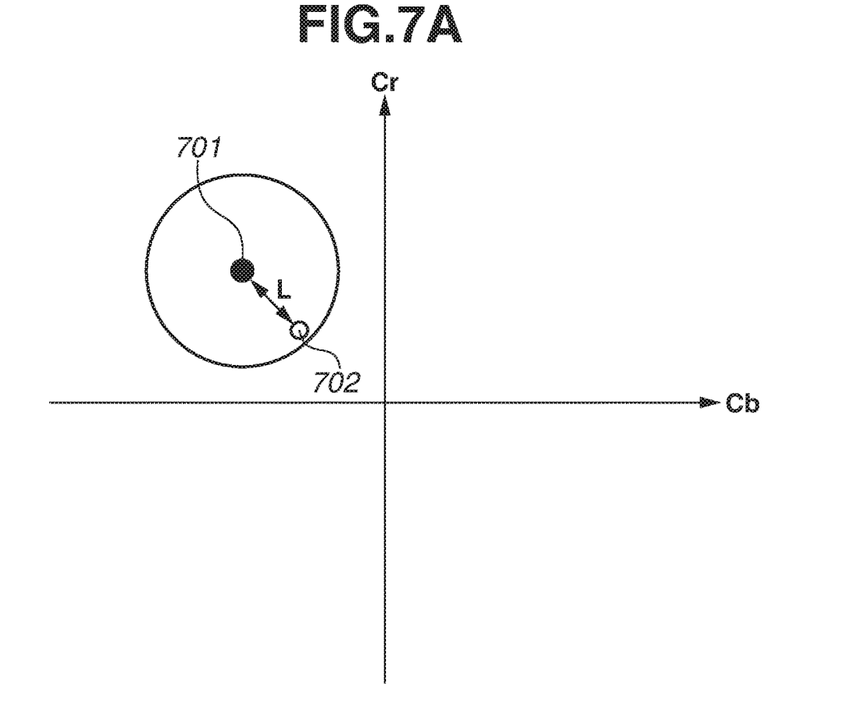
FIGS. 7A and 7B are diagrams each used for describing an example of calculation of a skin color weight.

In this process, the color correction weight generation unit 407 first calculates a distance L between color difference signals R-Yr and B-Yr in a parameter representing a reference color with a predetermined chrominance signal ratio determined by the system control unit 50, as described below, specifically a reference skin color 701 and the average values of color difference signals in the peripheral area. The distance means information representing a difference in color, and is hereinafter referred to as a color distance. More specifically, as illustrated in FIG. 7A, the color correction weight generation unit 407 calculates a color distance L between the color difference signals R-Yr and B-Yr in a reference skin color 701 and a peripheral skin color 702 corresponding to the average values of the color difference signals in the peripheral area.

More specifically, the color correction weight generation unit 407 calculates a color distance Lw representing a difference in color between the average values R-Yw and B-Yw of the color difference signals R-Y and B-Y in the wide range peripheral area 602 set for the processing target pixel and the color difference signals R-Yr and B-Yr in the reference skin color 701. The color correction weight generation unit 407 calculates a color distance Ln between the average values R-Yn and B-Yn of the color difference signals R-Y and B-Y in the narrow range peripheral area 604 set for the same processing target pixel as that at the time of setting the wide range peripheral area 602 and the color difference signals R-Yr and B-Yr in the reference skin color 701. Thus, the color correction weight generation unit 407 calculates the two color distances, i.e., the color distance Lw based on the wide range peripheral area 602 and the color distance Ln based on the narrow range peripheral area 604 as the color distance L.

Then, the color correction weight generation unit 407 calculates a skin color weight Sw based on the color distance L (the color distance Lw and the color distance Ln) from the reference skin color 701. The color correction weight generation unit 407 determines a skin color weight Sw using a parameter representing a control characteristic illustrated in FIG. 7B determined, as described below, by the system control unit 50. More specifically, the skin color weight Sw is set to a predetermined value when the color distance L from the reference skin color 701 is within a threshold color distance Ls based on the control characteristic illustrated in FIG. 7B, and is determined in such a manner that the farther the color distance L from the reference skin color 701 is apart from the threshold color distance Ls, the smaller the value of the skin color weight Sw is set. More specifically, in the present exemplary embodiment, the skin color weight Sw is determined based on the color distance L from the reference skin color 701 and the control characteristic illustrated in FIG. 7B. Thus, in a case where the color distance L from the reference skin color 701 is close to the threshold color distance Ls, the value of the skin color weight Sw is set to a large value. The color correction weight generation unit 407 uses the color distance Lw based on the wide range peripheral area 602 and the color distance Ln based on the narrow range peripheral area 604, to obtain the skin color weight Sw for each of the color distances based on the control characteristic illustrated in FIG. 7B. More specifically, the color correction weight generation unit 407 obtains a skin color weight Sww from the control characteristic illustrated in FIG. 7B based on the color distance Lw obtained from the wide range peripheral area 602, and obtains a skin color weight Swn from the control characteristic illustrated in FIG. 7B based on the color distance Ln obtained from the narrow range peripheral area 604.

The color correction weight generation unit 407 adds the two skin color weights Sww and Swn based on the luminance signal Y (the luminance signal Y normalized to 0 to 1) corresponding to the processing target pixel generated by the luminance generation unit 401, to calculate a color correction weight Cw. More specifically, the color correction weight generation unit 407 calculates the color correction weight Cw by the following equation (2):

$$Cw = Y \times Sww + (1-Y) \times Swn \quad (2).$$

Thus, in the present exemplary embodiment, when the value of the luminance signal Y corresponding to the processing target pixel is higher, the color correction weight Cw by the skin color weight Sww based on the wide range peripheral area 602, i.e., the color correction weight Cw which stresses color information extracted from the wide range is obtained. On the other hand, when the value of the luminance signal Y corresponding to the processing target pixel is lower, the color correction weight Cw by the skin color weight Swn based on the narrow range peripheral area, i.e., the color correction weight Cw which stresses color information extracted from the narrow range is obtained. As described above, the closer the color distance L from the reference skin color 701 is, the larger the value of the skin color weight Sw is set. Therefore, the color correction weight Cw is also obtained as a large value when the color distance L from the reference skin color 701 is close.

Referring to FIG. 4 again, the multiplication unit 408 multiplies the luminance correction weight Yw generated by the luminance correction weight generation unit 403 and the color correction weight Cw generated by the color correction weight generation unit 407, to generate a total correction weight signal YCw. More specifically, the multiplication unit 408 multiplies the luminance correction weight Yw corresponding to the processing target pixel by the color correction weight Cw generated by the color correction weight generation unit 407, to generate the total correction weight signal YCw corresponding to the processing target pixel. The multiplication unit 408 outputs the total correction weight signal YCw to the reflection correction signal generation unit 409.

The reflection correction signal generation unit 409 respectively multiplies parameters representing complementary color components Rs, Gs, and Bs of a skin color calculated, as described below, by the system control unit 50 by the total correction weight signal YCw, to generate correction signals R', G', and B'. More specifically, the reflection correction signal generation unit 409 generates the correction signals R', G', and B' by the following equation (3).

$$R' = \alpha \times Rs \times YCw$$

$$G' = \alpha \times Gs \times YCw$$

$$B' = \alpha \times Bs \times YCw \quad (3)$$

where α is a gain corresponding to a correction intensity at the time of shine correction processing input from the user, as described below, and the total correction weight signal YCw takes a value of "0 to 1". The reflection correction signal generation unit 409 outputs the generated correction signals R', G', and B' to the correction signal subtraction processing unit 410.

In the present exemplary embodiment, the correction signals R', G', and B' are generated based on the total correction weight signal YCw and the complementary color components Rs, Gs, and Bs, described above. The total correction weight signal YCw is generated based on the skin color weight Sw and the luminance correction weight Yw, described above. Then, the skin color weight Sw is determined based on the luminance signal Y corresponding to the processing target pixel, the color distance L from the reference skin color 701, and the control characteristic illustrated in FIG. 7B, as described above. More specifically, each of the correction signals R', G', and B' is set in such a manner that the higher the luminance signal Y corresponding to the processing target pixel is, the wider the range of the peripheral area where the color information is referred to is set, and the closer the color of the peripheral area to the skin color is, the higher the correction intensity is set.

The correction signal subtraction processing unit 410 subtracts the correction signals R', G, and B' generated by the reflection correction signal generation unit 409 from the R, G, and B signals fed from the WB amplification unit 201 illustrated in FIG. 2. More specifically, the correction signal subtraction processing unit 410 subtracts the correction signal R' from the R signal corresponding to the processing target pixel, subtracts the correction signal G' from the G signal corresponding to the processing target pixel, and subtracts the correction signal B' from the B signal corresponding to the processing target pixel.

Thus, in the reflection correction processing unit 202 illustrated in FIG. 4, shine correction processing is implemented for the processing target pixel having a high luminance in the shine area to reduce the luminance of the processing target pixel while bringing the processing target pixel close to a predetermined chrominance signal ratio, i.e., a desired skin color. More specifically, in the reflection correction processing unit 202, shine correction processing is performed in the following manner: the higher the luminance signal Y corresponding to the processing target pixel is, the wider the range of the peripheral area where the color information is referred to is set, and the closer the color of the peripheral area to the skin color is, the higher the correction intensity is set. The reflection correction processing unit 202 outputs the R, G, and B signals subjected to the subtraction processing by the correction signal subtraction processing unit 410, i.e., the R, G, and B signals which have been subjected to the shine correction processing to the luminance/chrominance signal generation unit 204 illustrated in FIG. 2.

<Processing for Determining Parameters Used in Shine Correction Processing>

With reference to a flowchart illustrated in FIG. 8, processing by the system control unit 50 to determine the parameters for the reference skin color 701 illustrated in FIG. 7A, the control characteristic and the threshold color distance Ls illustrated in FIG. 7B, and the complementary color components Rs, Gs, and Bs of the skin color, described above, will be described below. Prior to the start of the processing in the flowchart illustrated in FIG. 8, the system control unit 50 acquires a reflection correction on/off instruction indicating whether shine correction processing is performed in response to an instruction input from the user via the operation unit 120 and a value of a correction intensity a at the time of the shine correction processing. The correction intensity a may be previously determined. The system control unit 50 performs the processing in the flowchart illustrated in FIG. 8 when an on instruction indicating that shine correction processing is performed is input from the user.

In step S801, the system control unit 50 determines whether the on instruction indicating that shine correction processing is performed has been issued via the operation unit 120 by the user. In a case where the system control unit 50 determines that the on instruction indicating that shine correction processing is performed is issued (YES in step S801), the processing proceeds to step S802. On the other hand, in a case where the system control unit 50 determines that the on instruction indicating that shine correction processing is performed is not issued (the off instruction has been issued) (NO in step S801), the processing in the flowchart illustrated in FIG. 8 ends.

In step S802, the system control unit 50 acquires positional information about an image area of the face (a face area) of an object detected from an input image by the face detection unit 113 and an evaluation value generated by the evaluation value generation processing unit 203. The evaluation value acquired in this process is average values of the R, G, and B signals (R, G, and B average values) of each of a plurality of blocks obtained by dividing the input image, as described above. After step S802, the processing proceeds to step S803.

In step S803, the system control unit 50 detects each of the blocks corresponding to the face area 301 in the input image 300 illustrated in FIG. 3A, described above, for example, based on the positional information about the face area acquired in step S802. Further, the system control unit 50 obtains an average value of the evaluation values in each block corresponding to the face area 301, and sets the average value to an average value of color in the face area 301 (hereinafter referred to as a face color average value). The system control unit 50 sets the face color average value in the face area 301 as the reference skin color 701 (the parameter representing the reference skin color 701), as illustrated in FIG. 7A, described above, to be used when skin color likeness is determined. After step S803, the processing proceeds to step S804.

Figure 7B:
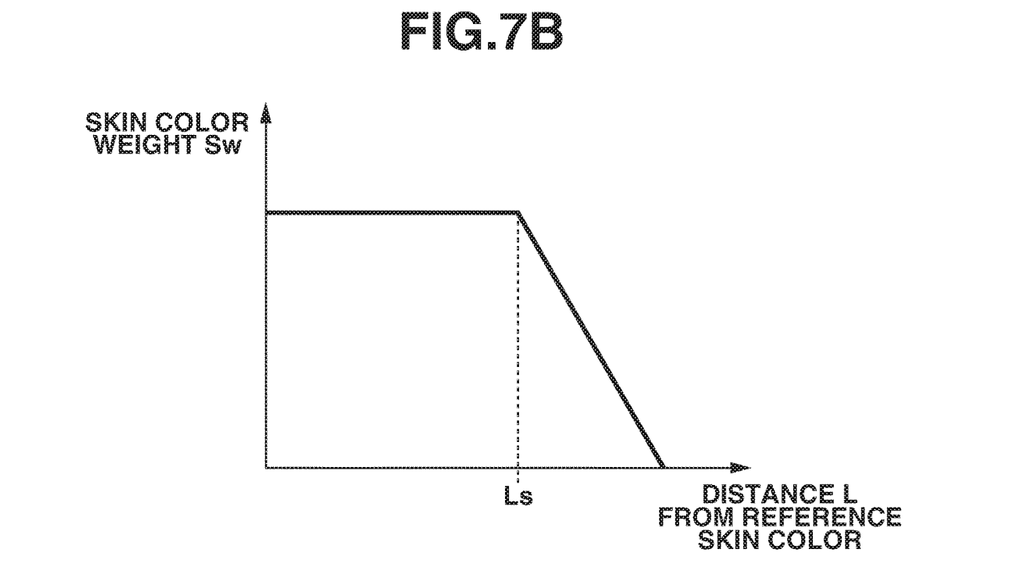

In step S804, the system control unit 50 determines the parameter of the control characteristic to be used when the skin color weight Sw, as illustrated in FIG. 7B, is generated. The system control unit 50 also determines the threshold color distance Ls illustrated in FIG. 7B based on a skin color distribution in the face area 301 as the parameter of the control characteristic. More specifically, the system control unit 50 detects a block having an evaluation value indicating the greatest color distance from the reference skin color 701 calculated in step S803 among the blocks included in the face area 301. The system control unit 50 determines a color distance between the evaluation value in the detected block and the reference skin color 701 calculated in step S803 as the threshold color distance Ls illustrated in FIG. 7B. More specifically, the threshold color distance Ls is determined based on the evaluation value in each of the blocks included in the face area 301 detected from the input image 300, i.e., a face color distribution. Accordingly, in the present exemplary embodiment, a color range of a correction target when the skin color of the face is corrected at the time of the shine correction processing is a color range including the face color distribution of the blocks included in the face area 301 detected from the input image 300. After step S804, the processing proceeds to step S805.

In step 805, the system control unit 50 generates parameters representing the complementary color components Rs, Gs, and Bs of the skin color to be set in the reflection correction signal generation unit 409. More specifically, the system control unit 50 sets the skin color (evaluation value) in the block area 302 representing the color of the face illustrated in FIG. 3B, for example, in the face area 301 illustrated in FIG. 3A as a target skin color to which the skin color is to be corrected, and sets the R, G, and B signals in the block area 302 as the complementary color components Rs, Gs, and Bs. After step S805, the processing proceeds to step S806.

In step S806, the system control unit 50 sets each of the parameters (the reference skin color, the control characteristic and the threshold color distance Ls, and the complementary color components Rs, Gs, and Bs of the skin color) determined in the above-described manner in the reflection correction processing unit 202 illustrated in FIGS. 2 and 4. Thus, the reflection correction processing unit 202 can perform shine correction processing, as described above, using the parameters.

As described above, the digital camera 100 according to the present exemplary embodiment determines the intensity in the shine correction processing for the shine area based on the color information about the pixels in the area peripheral to the processing target pixel. Thus, the digital camera 100 according to the present exemplary embodiment can perform highly accurate shine correction processing in which a high-luminance saturation area (shine area) which has appeared white by environment light being reflected on the face, for example, and an originally white area, such as, the white of the eye of the face are nearly accurately distinguished.

While the face area of the person has been taken as an example of a specific object area in the above-described exemplary embodiment, the object is not limited to the person. Even in the case of an object other than the person, the present exemplary embodiment is applicable. When the object is other than the person, if a typical color of the object is used as a reference color instead of the skin color of the face, described above, similar shine correction processing to the above can be performed.

In the above-described exemplary embodiment, the sizes (ranges) of the wide range peripheral area 602 illustrated in FIG. 6A and the narrow range peripheral area 604 illustrated in FIG. 6B are fixed. However, the ranges of the peripheral areas may be changed as needed, depending on the object. For example, the ranges of the wide range peripheral area and the narrow range peripheral area can also be adaptively changed depending on the size of the face. The shape of the peripheral area may also be similarly adaptively changed depending on the shape of the object, for example. Not only the wide range peripheral area and the narrow range peripheral area but also at least one intermediate range peripheral area of a size which is an intermediate size between the sizes of the wide range peripheral area and the narrow range peripheral area may be set. If a ratio of the number of pixels having saturated luminances is a predetermined ratio or less in a range in which shine correction processing is to be performed, e.g., a face area, a minimum peripheral area, for example, may be made selectable. In this case, an area where no shine occurs becomes selectable as a peripheral area.

A peripheral area set for the processing target pixel may be determined based on a pixel feature. In this case, an area having a different pixel feature from that of the processing target pixel is set as the peripheral area. More specifically, an area having a different pixel feature, such as luminance or color, from that of the processing target pixel can be extracted as a peripheral area. If an area having a different luminance from that of the processing target pixel is set as a peripheral area, for example, a peripheral pixel having a lower luminance than that of the processing target pixel may be set as a peripheral area. If an area having a different color from that of the processing target pixel is extracted as a peripheral area, a peripheral pixel having a higher color saturation than that of the processing target pixel may be set as a peripheral area, as an example.

Figure 9A:
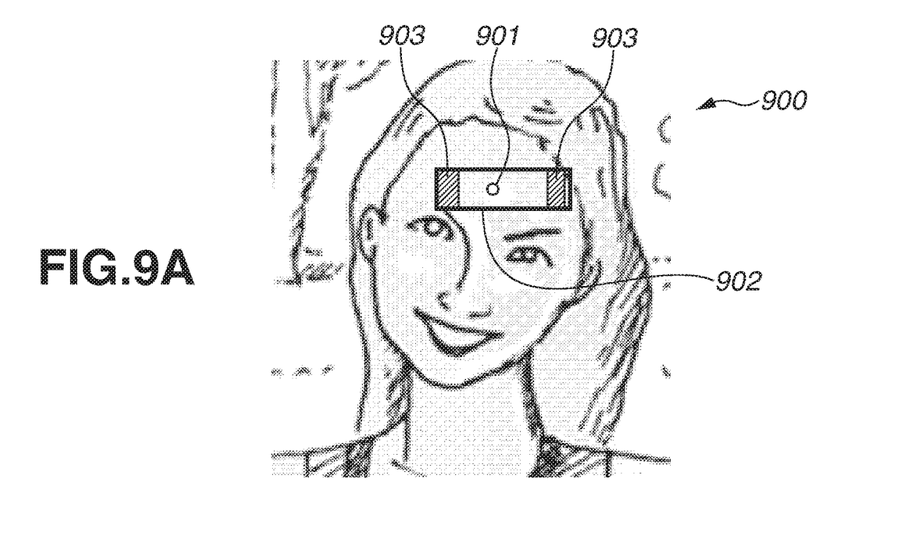
FIGS. 9A, 9B, and 9C are diagrams each used for describing an example of a setting of a peripheral area based on a pixel feature.

An area having a different normal line direction from that of the processing target pixel can also be extracted as a peripheral area which differs in pixel feature from the processing target pixel. A normal line in this case means a normal line in a skin reflection model of a face. If the area, which differs in normal line direction from the processing target pixel, is extracted as a peripheral area, normal line information about the pixels peripheral to the processing target pixel is referred to, and the pixel, which differs by a predetermined angle or more in normal line direction from the processing target pixel, is extracted as a pixel in the peripheral area. It is then determined whether the processing target pixel is a pixel in a high-luminance saturation area or an originally white pixel, based on color information about the peripheral area and color information about the processing target pixel. A correction intensity in shine correction processing is thus controlled in response to a determination result. When described with reference to FIGS. 9A, the image processing unit 105 in this case sets, if a processing target pixel 901 in an input image 900 is a high-luminance pixel, a search frame 902 around the pixel. Further, the image processing unit 105 extracts an area 903 including pixels each having a normal line, which differs by a predetermined angle or more in the normal line direction from the processing target pixel 901, from within the search frame 902. The image processing unit 105 increase a correction intensity in shine correction processing for the processing target pixel 901 if the color of the pixels in the extracted area 903 is close to a skin color. More specifically, the area 903, which differs in the normal line direction from the processing target pixel 901 in a shine area, differs in reflection characteristic from the shine area, and may probably have a different color from that of the shine area. Thus, if the color of the area 903 is close to the skin color, when shine correction processing with a high correction intensity is performed for the processing target pixel 901, good correction for the shine area can be performed. On the other hand, if the color of the area 903, which differs in the normal line direction from the processing target pixel 901, is far from the skin color, the correction intensity in the shine correction processing is decreased for the processing target pixel 901. Thus, deterioration in image quality by an excess or an error in correction can be prevented. Even when the area 903, which differs in the normal line direction from the processing target pixel 901, is an area close to the processing target pixel 901, the correction intensity in the shine correction processing may be decreased for the processing target pixel 901.

Figure 9B:
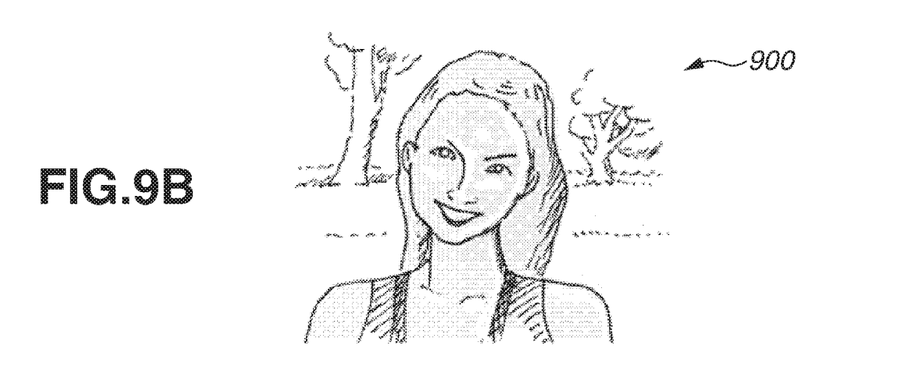
Figure 9C:
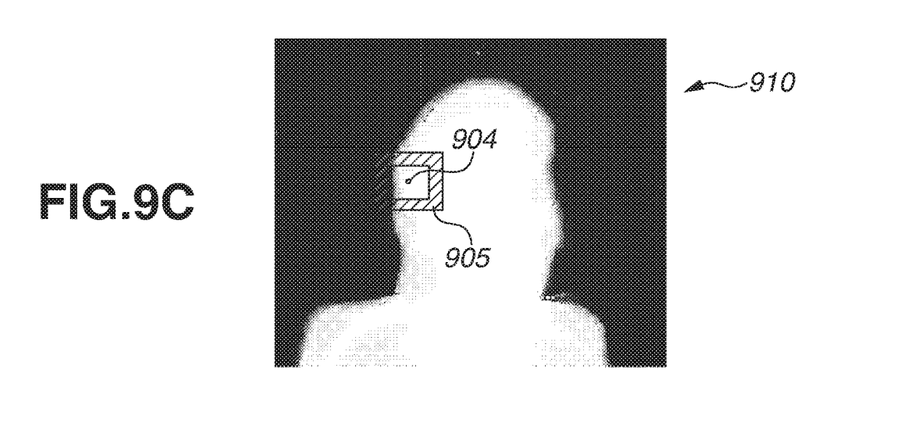

In the above-described exemplary embodiment, all the pixels included in the peripheral area are used as a reference target. However, a range set to as the reference target may be further adjusted within the peripheral area using object distance information from a digital camera to an object. For example, only the pixel having a closer object distance within a predetermined threshold distance than an object distance of the processing target pixel among the pixels within the peripheral area is used as a reference target. As a more specific example, if an input image 900 is obtained by capturing a person, as illustrated in FIG. 9B, for example, the image processing unit 105 acquires an object distance map 910 including an object distance for each of pixels, as illustrated in FIG. 9C, from the above-described ranging sensor 124. In the example of the object distance map 910 illustrated in FIG. 9C, a distribution of the pixels close to an object distance of the person is represented by a white area, and a distribution of the pixels far from the object distance of the person is represented as a black area. A processing target pixel 904 and a wide range peripheral area 905, for example, are set in FIG. 9C, the image processing unit 105 sets only the pixels (a white area) each of which is close in object distance to the processing target pixel 904 in the wide range peripheral area 905 as a reference target. Thus, information about a color is acquired only from an area (a white area) which is close in object distance to the processing target pixel 904 in the wide range peripheral area 905. Accordingly, the color of an object which is distinctly different from objects such as the person (an object such as a background other than the person) can be prevented from being referred to.

Figure 8:
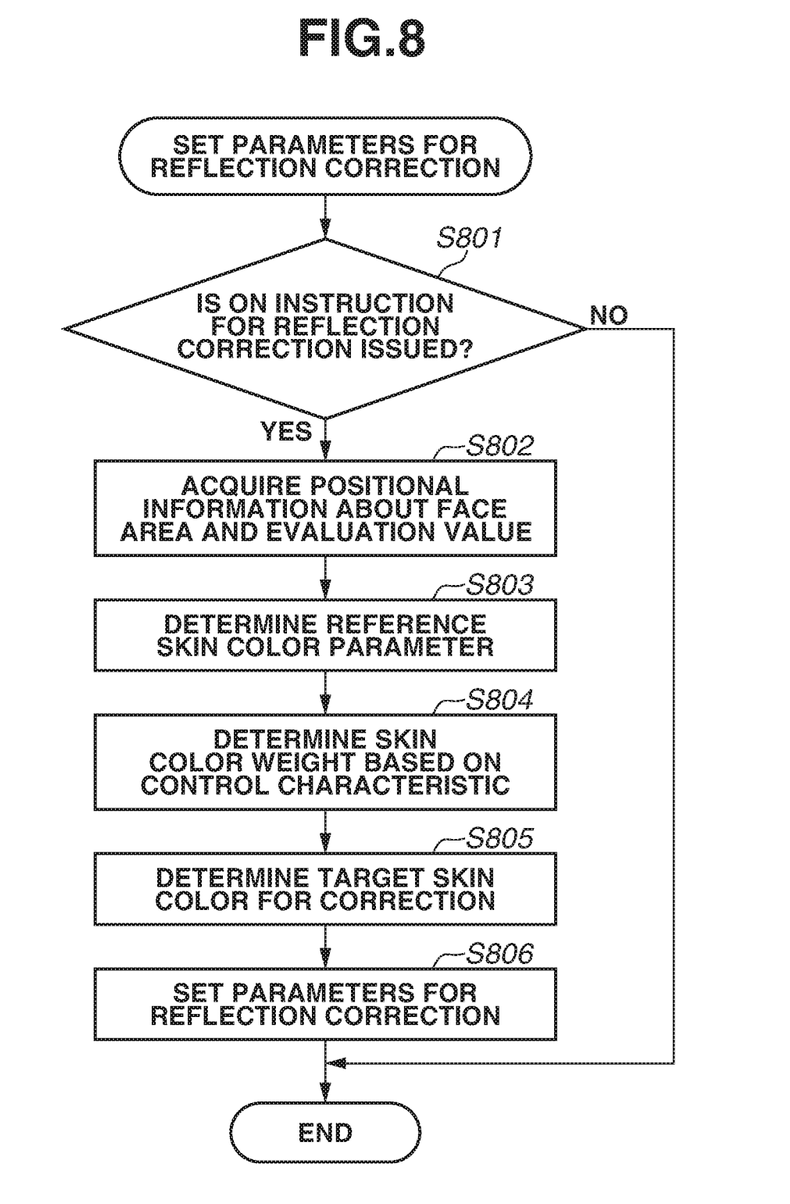
FIG. 8 is a flowchart illustrating parameter determination processing for reflection correction processing.

In the above-described exemplary embodiment, the reference skin color to which the skin color is to be corrected is determined from the skin color of a partial area of the face, as described in step S805 illustrated in FIG. 8. However, a method for selecting the skin color to which the skin color is to be corrected is not limited to this example. For example, the reference skin color to which the skin color is to be corrected can also be adaptively controlled in units of pixels to be processed. In this case, it can be possible to perform control of, for example, setting an average value of colors close to a skin color of pixels peripheral to a correction target pixel as a reference skin color, for each correction target pixel to be processed.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

The above-described exemplary embodiment is only an example of implementation in practicing the disclosure, and a technical scope of the disclosure is not to be restrictively interpreted. More specifically, the aspect of the embodiments can be practiced in various forms without departing from the technical thought or its principal features.

According to the disclosure, an input image can be prevented from being erroneously corrected.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-176563, filed Sep. 9, 2016, which is hereby incorporated by reference herein in its entirety.

What is claimed is:

1. An image processing apparatus comprising:
at least one processor and/or circuit configured to function as following units:
a detection unit configured to detect a specific object area from an image;
a correction processing unit configured to perform correction, on a processing target pixel having a luminance higher than a predetermined value in the image, to reduce the luminance of the processing target pixel and to bring a chrominance signal ratio of the processing target pixel closer to a predetermined chrominance signal ratio, wherein the predetermined chrominance signal ratio corresponds to a representative color of the specific object area; and
an extraction unit configured to extract at least color information from a peripheral area of the processing target pixel in the image,
wherein the correction processing unit compares a chrominance signal ratio based on the color information with the predetermined chrominance signal ratio and controls an intensity of the correction to the processing target pixel according to a comparison result.

2. The image processing apparatus according to claim 1, wherein the extraction unit changes the peripheral area based on the luminance of the processing target pixel.

3. The image processing apparatus according to claim 2, wherein the extraction unit sets a range of the peripheral area wider when the luminance of the processing target pixel is higher.

4. The image processing apparatus according to claim 1, wherein the extraction unit extracts the color information from a plurality of the peripheral areas, the number of the plurality of the peripheral areas being more than two, the plurality of the peripheral areas being different from each other in size.

5. The image processing apparatus according to claim 4,
wherein the extraction unit generates information about a color correction weight by adding a weight to the color information extracted from the plurality of the peripheral areas, based on the luminance of the processing target pixel, and
wherein the correction processing unit performs the correction on the processing target pixel based on the information about the color correction weight.

6. The image processing apparatus according to claim 5, wherein the extraction unit generates the information about the color correction weight by obtaining information about a color weight for each of the plurality of the peripheral areas based on a color distance representing a difference in color between the color information extracted from the plurality of the peripheral areas and a reference color and adding the information about the color weights of the plurality of the peripheral areas based on the luminance of the processing target pixel.

7. The image processing apparatus according to claim 5, wherein the correction processing unit performs the correction by generating a correction signal to the processing target pixel through multiplication of the color correction weight by a luminance correction weight obtained based on the luminance of the processing target pixel and subtracting the correction signal from a chrominance signal of the processing target pixel.

8. The image processing apparatus according to claim 7, wherein the correction processing unit calculates the luminance correction weight by subtracting a luminance signal, which is obtained by subjecting a luminance signal of the input image to low-pass filter processing, from the luminance signal in the input image.

9. The image processing apparatus according to claim 1, wherein the extraction unit sets, as the peripheral area, an area including pixels which differ from the processing target pixel in one or more of pixel features including a luminance, a color, and a normal line.

10. The image processing apparatus according to claim 9, wherein the extraction unit sets, in a case where an area including pixels, which differ from the processing target pixel in luminance, is set as a peripheral area, an area including pixels each having a luminance lower than the luminance of the processing target pixel as the peripheral area.

11. The image processing apparatus according to claim 9, wherein the extraction unit sets, in a case where an area including pixels, which differ from the processing target pixel in color, is set as a peripheral area, an area including pixels each having a color saturation higher than color saturation of the processing target pixel as the peripheral area.

12. The image processing apparatus according to claim 9, wherein the extraction unit sets, in a case where an area including pixels, which differ from the processing target pixel in a normal line, is set as a peripheral area, an area including pixels, which differ from the processing target pixel in a normal line direction by a predetermined angle or more, as the peripheral area.

13. The image processing apparatus according to claim 1, wherein the extraction unit changes a range of the peripheral area based on the size of the specific object area.

14. The image processing apparatus according to claim 1, further comprising:
a ranging unit configured to detect an object distance,
wherein the extraction unit extracts the color information from an area having a predetermined threshold distance or less with respect to an object distance of the processing target pixel, in the peripheral area.

15. The image processing apparatus according to claim 1, wherein
the specific object area is a face area of an object, and
the representative color is a skin color.

16. An image processing method comprising:
detecting a specific object area from an image;
performing correction, on a processing target pixel having a luminance higher than a predetermined value in the image, to reduce the luminance of the processing target pixel and to bring a chrominance signal ratio of the processing target pixel closer to a predetermined chrominance signal ratio, wherein the predetermined chrominance signal ratio corresponds to a representative color of the specific object area; and
extracting at least color information from a peripheral area of the processing target pixel in the image,
wherein the performing correction compares a chrominance signal ratio based on the color information with the predetermined chrominance signal ratio, and controls an intensity of the correction to the processing target pixel according to a comparison result.

17. The image processing method according to claim 16, further comprising:
detecting an object distance,
wherein the extracting extracts the color information from an area having a predetermined threshold distance or less with respect to an object distance of the processing target pixel, in the peripheral area.

18. A computer readable non-transitory storage medium storing a control program for causing a computer to execute an image processing method used in an image processing apparatus, the image processing method comprising:
detecting a specific object area from an image;
performing correction, on a processing target pixel having a luminance higher than a predetermined value in the image, to reduce the luminance of the processing target pixel and to bring a chrominance signal ratio of the processing target pixel closer to a predetermined chrominance signal ratio, wherein the predetermined chrominance signal ratio corresponds to a representative color of the specific object area; and
extracting at least color information from a peripheral area of the processing target pixel in the image,
wherein the performing correction compares a chrominance signal ratio based on the color information with the predetermined chrominance signal ratio, and controls an intensity of the correction to the processing target pixel according to a comparison result.

19. The computer readable non-transitory storage medium according to claim 18, further comprising:
detecting an object distance,
wherein the extracting extracts the color information from an area having a predetermined threshold distance or less with respect to an object distance of the processing target pixel, in the peripheral area.

\* \* \* \* \*